Jan. 19, 1965 E. P. ANSTETT 3,165,968
SYNTHETIC PLASTIC NAILING STRIP
Filed July 23, 1962
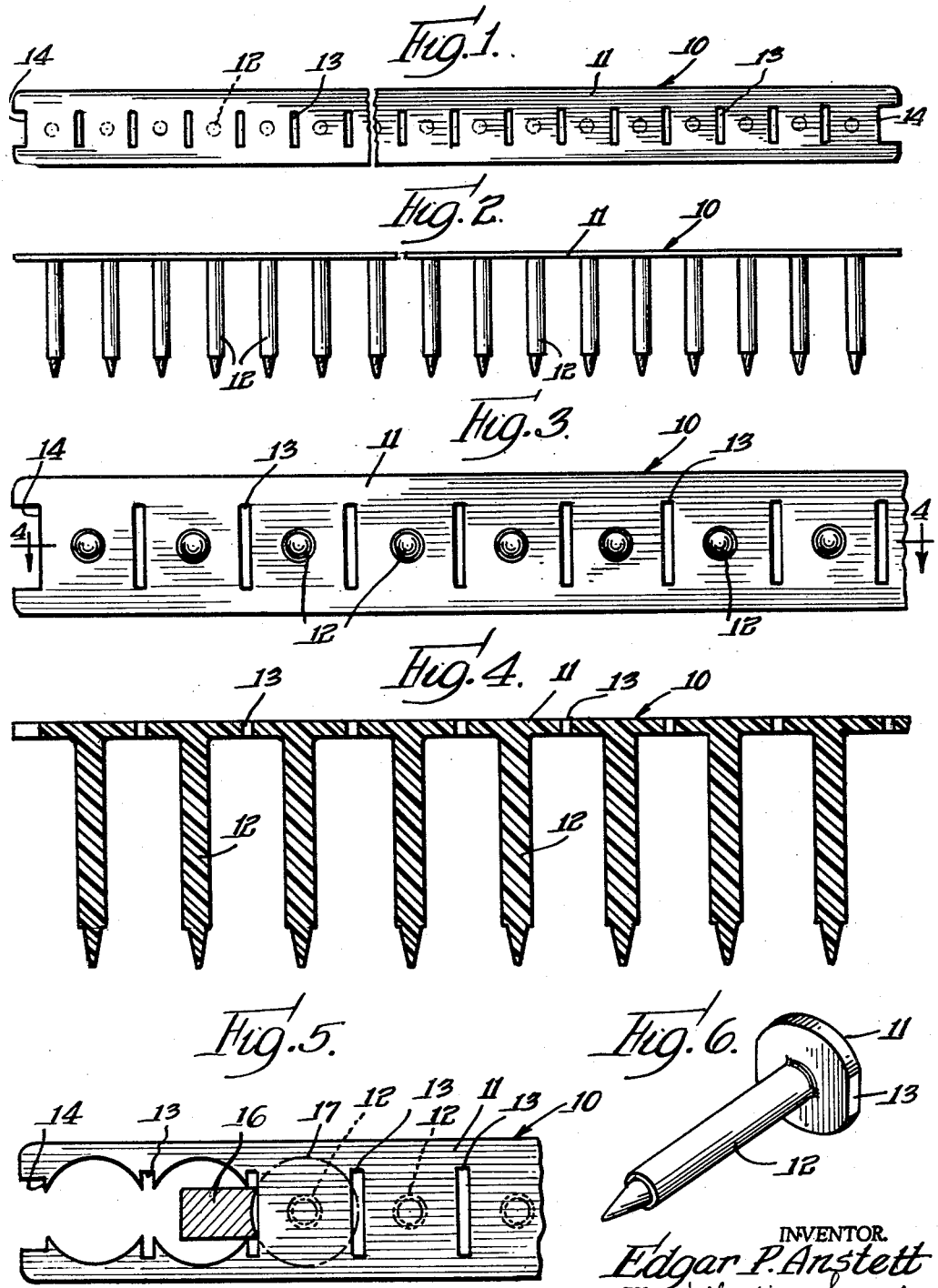
INVENTOR.
Edgar P. Anstett
BY Wallenstein, Spangenberg
& Hattis
Attys.

United States Patent Office 3,165,968
Patented Jan. 19, 1965

3,165,968
SYNTHETIC PLASTIC NAILING STRIP
Edgar P. Anstett, 21 Lakewood Place, Highland Park, Ill.
Filed July 23, 1962, Ser. No. 211,809
1 Claim. (Cl. 85—17)

The principal object of this invention is to provide an improved nailing strip wherein headed nails may be progressively severed and driven therefrom by a nailing machine, such as the pneumatically power operated nailing machine disclosed in my copending application Ser. No. 211,551, filed on even date herewith, wherein a pluarlity of synthetic plastic nail shanks are integrally molded with a synthetic plastic supporting strip in longitudinally spaced apart relation, wherein the synthetic plastic supporting strip is shearable about each synthetic plastic nail shank to provide synthetic plastic headed nails which may be sequentially severed and driven from the supporting strip by the nailing machine, wherein such severed and driven synthetic plastic headed nails form rust free fasteners which are ideally suited for roofing purposes and the like, and wherein the synthetic plastic nailing strip may be readily and inexpensively produced on a high rate production basis.

Briefly, the nailing strip of this invention includes an elongated synthetic plastic strip, and a plurality of synthetic plastic nail shanks integrally molded with the strip, the nail shanks extending from one side of the strip in longitudinally spaced apart relation. The synthetic plastic strip is preferably provided with transverse slots between adjacent nail shanks for indexing the nailing strip in the nailing machine. The synthetic plastic strip is shearable about each synthetic plastic nail shank through the slots to provide synthetic plastic headed nails which may be sequentially severed and driven from the nailing strip by the nailing machine. The synthetic plastic nailing strip of this invention may be readily, rapidly and inexpensively produced by a suitable injection molding process or the like. Any suitable synthetic plastic material having the necessary toughness to withstand the severing and driving of the headed nails from the nailing strip may be utilized, as for example, a polyamide resin product such as Du Pont's Nylon 101 or the like. The nailing strip may be of any desired length for convenient handling and use in the nailing machine, as for example, about 15 inches long and carrying about 33 nail shanks.

Further objects of this invention reside in the details of construction of the synthetic plastic nailing strip and in the cooperative relationships between the component parts thereof.

Other objects and advantages of this invention will become apparent to those skilled in the art upon reference to the accompanying specification, claim and drawings in which:

FIG. 1 is a top plan view of the synthetic plastic nailing strip of this invention;

FIG. 2 is a side elevational view thereof;

FIG. 3 is an enlarged bottom view of a portion of the synthetic plastic nailing strip illustrated in FIGS. 1 and 2;

FIG. 4 is an enlarged vertical sectional view through the synthetic plastic nailing strip taken substantially along the line 4—4 of FIG. 3;

FIG. 5 is a top plan view of the synthetic plastic nailing strip showing the manner in which headed nails are severed and driven therefrom; and FIG. 6 is a perspective view of a synthetic plastic headed nail severed and driven from the synthetic plastic nailing strip.

The synthetic plastic nailing strip of this invention is generally designated at 10 and it includes an elongated synthetic plastic strip 11 and a plurality of synthetic plastic nail shanks 12 extending from one side of the strip 11 in longitudinally spaced apart relation. The supporting srtip 11 and the nail shanks 12 are integrally molded by a suitable injection molding process or the like and the synthetic plastic material from which the nailing strip 10 is molded may be of any suitable kind as expressed above. The supporting strip 11 is also provided with transverse slots 13 arranged between the nail shanks 12, these slots 13 being formed in the supporting strip during the molding operation. The ends of the strip 11 are provided with notches 14 which are positioned with respect to the nail shanks 12 in the same manner as the slots 13, these notches 14 also being formed during the molding operation. Thus the synthetic plastic nailing strip 11 of this invention may be readily, rapidly and inexpensively produced on a high rate production basis.

Referring now to FIGS. 5 and 6, the manner of severing and driving synthetic plastic headed nails from the synthetic plastic nailing strip is illustrated. The nailing machine with which the nailing strip is utilized includes die means for guiding and advancing the strip and the die means includes a projection 16 which is adapted to be engaged by the end notch 14 and subsequently by the transverse slots 13 for centering a nail shank under a blade 17. When the blade 17 is advanced, a headed nail is severed and driven from the nailing strip and when the blade 17 is retracted, the nailing strip is advanced until the next slot 13 engages the projection 16 for centering the next headed nail to be severed and driven from the nailing strip. This operation is continued until all of the headed nails have been severed and driven from the nailing strip. It is here noted that the concave front of the projection 21 conforms to the contour of the advancing and retracting blade 17 and that the projection 16 accurately aligns each nail shank with the blade 17. The blade 17 shears the supporting strip 11 about the nail shank 12 and though the transverse slots 13 so that the scrap material of the strip 11 readily passes the projection 16 as shown in the left hand portion of FIG. 5. In severing and driving the headed nail from the supporting strip 11 the strip is sheared about the nail shank 12 so as to provide a substantial nail head for the nail shank 12, such a headed nail being illustrated in FIG. 6. Since the headed nails, severed and driven from the synthetic plastic nailing strip of this invention, are completely formed of synthetic plastic, the headed nails are completely rust free and are ideally suited for roofing purposes and the like.

While for purposes of illustration one form of this invention has been disclosed, other forms thereof may become apparent to those skilled in the art upon reference to this disclosure and, therefore, this invention is to be limited only by the scope of the appended claim.

I claim as my invention:

A nailing strip for use in a nailing machine comprising an elongated substantially flat molded synthetic plastic strip having substantially parallel side edges, and a plurality of synthetic plastic pointed nail shanks integrally molded with the strip and extending from one side of the strip intermediate the side edges of the strip in longitudinally spaced apart relation along the strip, said synthetic plastic strip having slots transverse to said side edges between adjacent nail shanks, said slots defining parallel openings for indexing the nailing strip in the nailing machine and being shearable about each synthetic plastic nail shank through the slots to provide synthetic plastic headed nails which may be sequentially severed and driven from the nailing strip by the nailing machine.

References Cited in the file of this patent

UNITED STATES PATENTS

| | | |
|---|---|---|
| 288,958 | Titzell | Nov. 20, 1883 |
| 329,544 | Flagg et al. | Nov. 3, 1885 |
| 729,336 | Hass | May 26, 1903 |
| 747,171 | Hass | Dec. 15, 1903 |
| 839,836 | Greenfield | Jan. 1, 1907 |
| 2,357,637 | Drypolcher | Sept. 5, 1944 |
| 2,527,253 | Hedfield et al. | Oct. 24, 1950 |